Nov. 12, 1968   R. A. S. TEMPLETON   3,409,999
DEHYDRATION APPARATUS
Original Filed Aug. 3, 1964   3 Sheets-Sheet 1

INVENTOR
Robert A. S. Templeton
BY
Pennie, Edmonds, Morton, Taylor & Adams
ATTORNEYs

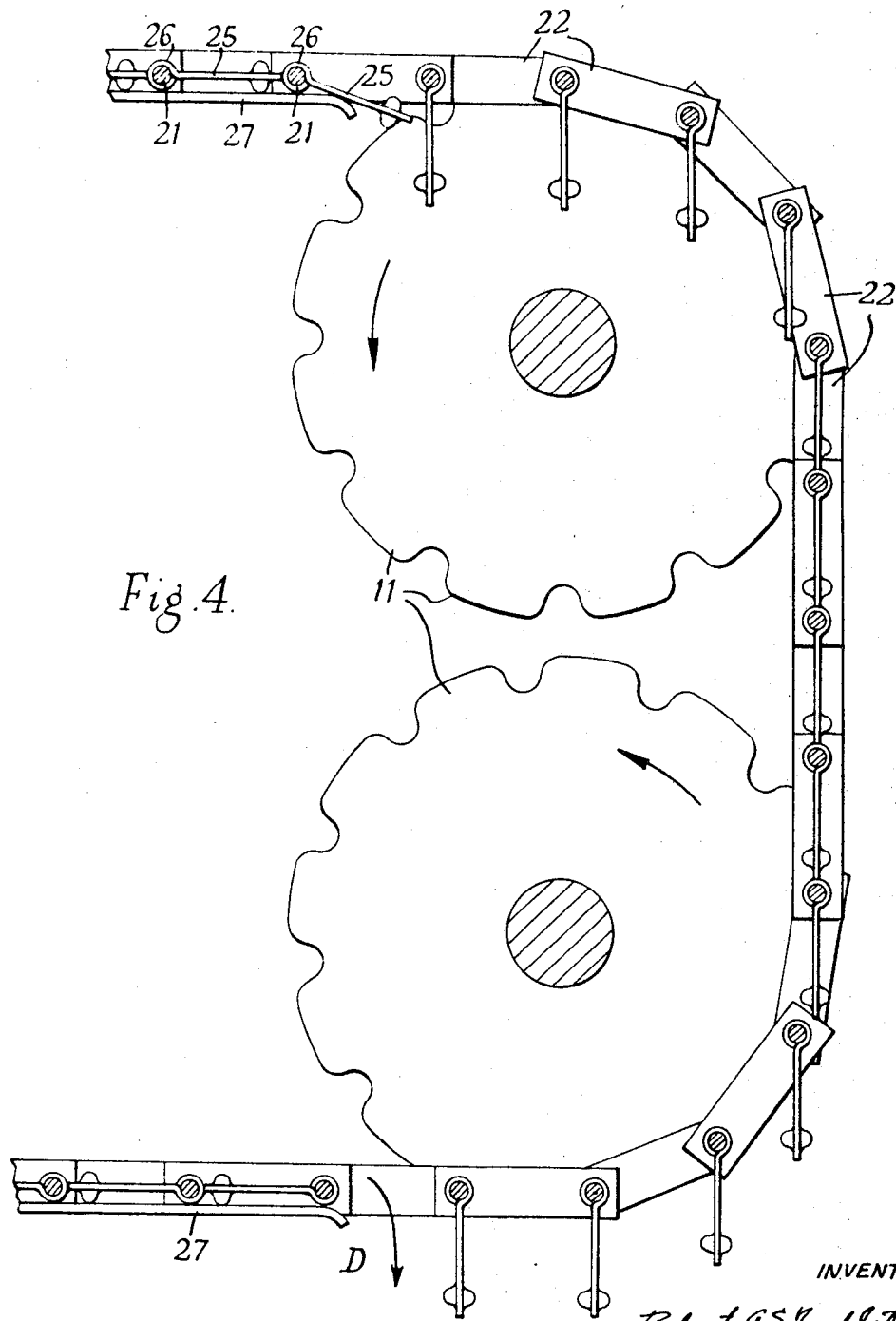

United States Patent Office 3,409,999
Patented Nov. 12, 1968

3,409,999
DEHYDRATION APPARATUS
Robert A. S. Templeton, 58 Mark Lane,
London E.C.3, England
Continuation of application Ser. No. 386,824, Aug. 3, 1964. This application Jan. 10, 1967, Ser. No. 608,460
Claims priority, application Great Britain, Aug. 12, 1963, 31,783/63
1 Claim. (Cl. 34—216)

ABSTRACT OF THE DISCLOSURE

Apparatus for drying diced fruit and vegetables comprising a plurality of superposed conveyors having pivoted drop plates so that diced material can drop from one conveyor run to the next at the end of each run. Drying air is introduced at different levels and the air is separately heated at each level.

---

Figure 1:
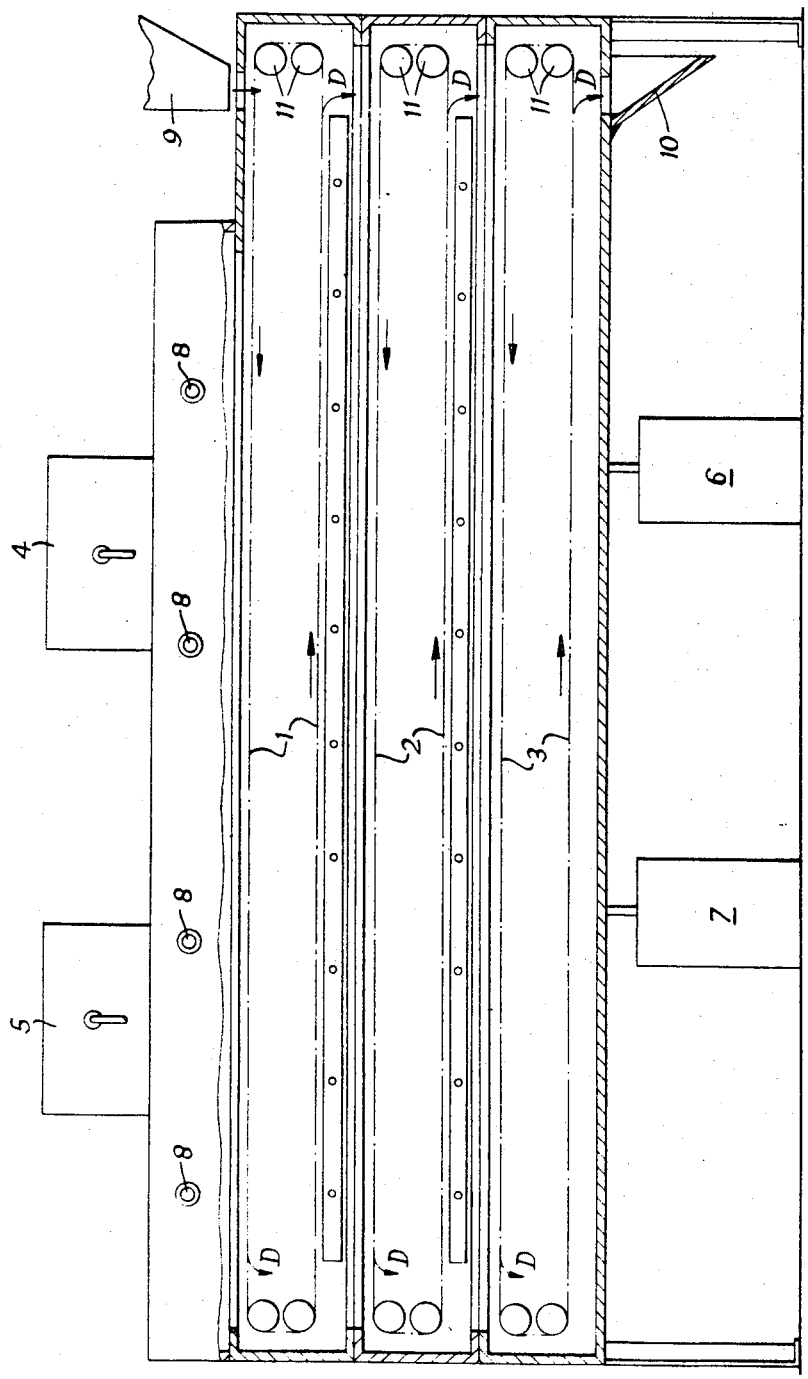

This application is a continuation of application Ser. No. 386,824, filed Aug. 3, 1964.

The present invention relates to an apparatus for the dehydration of fruits and vegetables on a continuous basis.

In existing commercial apparatus for the dehydration of fruits and vegetables, a batch of the material to be dried, usually in the form of dice or slices, is subjected to a stream of warm air, which is directed over or through a shallow bed of the material, usually supported on a woven wire tray. Due to the fact that air follows the path of least resistance it is usual for proportions of the pieces to be rather overdried and others underdried and, in consequence, there are frequently in the final product a number of pieces which can only be reconstituted with difficulty and decrease the quality.

I have already described in my British Patent No. 866,208 an apparatus, intended principally for the dehydration of fruit and vegetables, in which the material to be treated is supported on conveyors formed of a plurality of endless parallel strands, which offer little resistance to the movement of a stream of warm air. The bed of material on the conveyor is disturbed without mechanical impact by dropping it by gravity from the top run of the conveyor onto the return run below by deflecting alternate conveyor strands out of the plane of the remainder of the strands. For example, the existing apparatus may employ three such conveyors one above the other, with the result that the material is disturbed and its surfaces for treatment changed five times during dehydration. This greatly reduces the problem of overdried pieces or of irregular drying generally.

It is an object of the present invention to provide an improved form of apparatus which enables a continuously moving bed of diced or sliced vegetable or fruit to be dried by means of a stream of warm air and which also provides means for disturbing the bed of material periodically to avoid difficulties due to irregular drying of the bed by changing the surfaces under treatment without mechanical impacts to avoid injury and by the arrangement of gravity drops and changes.

It will be understood that a bed of material, to be dried by passage of a stream of warm dry air through or over the bed, must be of substantially uniform thickness; otherwise areas of less thickness will be dried at a much greater rate than areas of greater thickness because of differential resistance to passage of air and this would lead to an unsatisfactory product.

Apparatus for the production of dehydrated fruit and vegetables must be designed to handle as wide a range of material as possible, so that it may be usefully employed for as long a period as possible in each year. Abrasion or injury by mechanical impacts must be avoided.

In the dehydration of fruits and vegetables the largest discrete pieces which are dried by the application of warmed air streams are normally about $3/8''$ cubes. Pieces above that size have a volume/surface area ratio too large to permit them to be dried economically.

It follows that a successful dehydration apparatus must be capable of drying pieces of that size and to achieve good results means must be provided to ensure that the bed of material is maintained at substantially uniform thickness.

With this object in view the present invention provides an apparatus for dehydration of fruit and vegetables, which comprises one or more endless conveyors arranged within a casing, through which a stream of warm air is passed, each conveyor being formed from a series of perforated plate-like members, piovted about axes which extend perpendicularly to the direction of movement of the conveyor, the said plate-like members being adapted to be maintained in the same plane so that the upper and lower run of the conveyor acts as a tray for a bed of material and to pivot individually at a dropping point at the end of each conveyor run to drop the material supported thereon onto a conveyor run below, the width of each plate-like member in the direction of movement of the conveyor being related to its distance above the next conveyor run in such manner that the material falling onto the next conveyor run forms a bed of substantially uniform thickness. It is, in fact, found that the desirable width of the plate-like members to achieve this result is about 3 inches, when the vertical interval between adjacent conveyor runs is 1–2 feet, but in practice a width of the transversely pivoted plate-like members, which form the conveyor, of about 2 inches does produce a more even bed following the drop of products induced by gravity in the direction in which the conveyor travels. The plate-like members are pivoted along their front edges on pivot members, which are connected between a pair of drive chains and ride on rails positioned close to the drive chains. The rails terminate close to the outlet end of each conveyor run and at such point the hinged plates tilt about their pivots to permit the material, supported on them, to drop by gravity onto the next conveyor run. It is found that with vegetable dice of the size quoted above, the width of 2 inches for the plate-like members is about the practical maximum to maintain a substantially uniform bed of material on the next conveyor run.

Since drying is effected by the passage of air through the run of the conveyor, each plate is chosen to have the minimum solid area consistent with having perforations small enough to prevent much material falling through onto the next run of the conveyor, and satisfactory strength. In practice it is found that stainless steel plates, having square apertures of $5/32''-3/16''$ size at $5/16''$ centres, are the most satisfactory for diced vegetables.

As will be readily understood the dehydration apparatus includes a plurality of conveyors arranged one above the other, the fresh material being fed in at the top and descending by gravity from each conveyor run to the conveyor run below it and being removed at the bottom of the apparatus.

The conveyors are preferably housed within a casing and warmed air may be injected into it at one or more levels, the whole of the spent air conveniently being withdrawn at the top.

Whilst the freshly cut material still has a damp surface at the beginning of the dehydration operation, it can be dried at a relatively rapid rate and therefore on the top of the conveyor a relatively shallow bed of material is subjected to a relatively large flow of air at relatively high temperature, say up to 300° F. The speed of the lower conveyor may be reduced as compared with the top conveyor because the surface-dried material thereon can now be formed into a thicker bed by driving the conveyor more slowly. At this stage the material can only tolerate a lower heat value than in the initial stage, say, 200° F. A third conveyor can extend the same advantages of thicker bed by retarded speed at again lower temperature, say, 150° F., and on the final run may be used to cool the product by using atmospheric air or refrigerated air.

Figure 2:
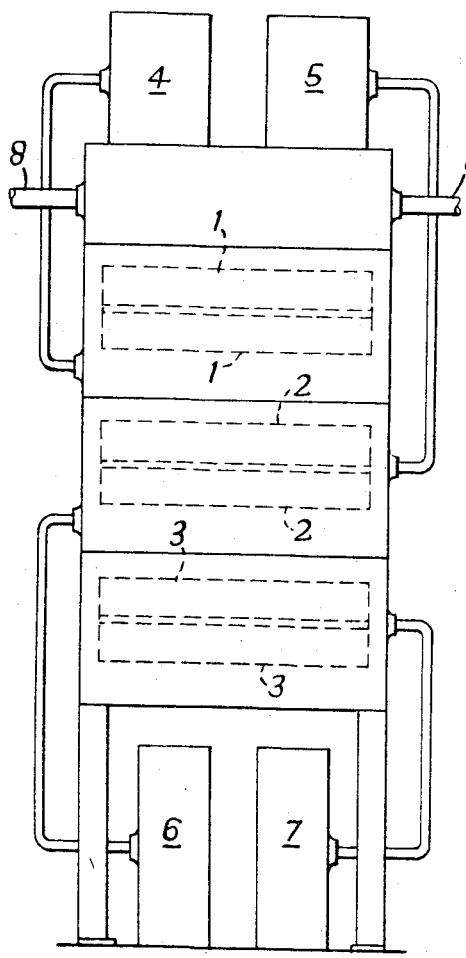
Figure 3:
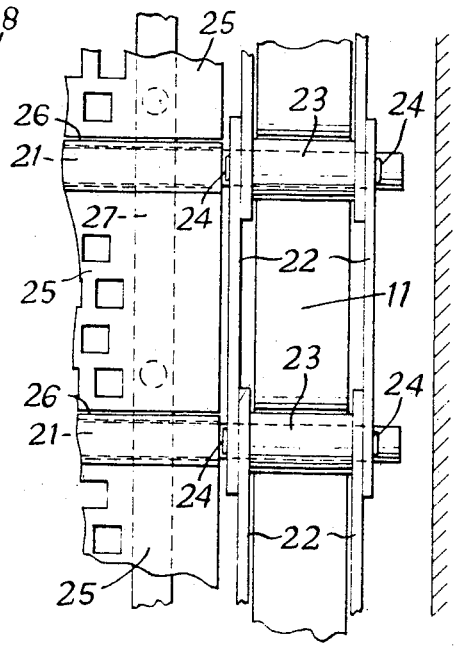

Referring now to the accompanying drawings:

FIGURE 1 is a diagrammatic side view of a dehydration apparatus made in accordance with the invention, FIGURE 2 is a diagrammatic end view, FIGURE 3 is a partial plan view of a conveyor run, and FIGURE 4 is a partial side view of a conveyor.

In the apparatus shown in FIGURES 1 and 2 three conveyors 1, 2, 3 are arranged, one above the other, within an enclosed outer casing. The three conveyors are constructed to operate on the principles above described and material is arranged to drop from the conveyor runs at the drop points D.

Each conveyor is driven through a variable speed gear, but in operation the conveyor 1 is driven about three times as fast as the conveyor 2 and six times as fast as the conveyor 3, so that the thickness of the beds on the runs of these conveyors is approximately inversely proportional to their speed, but allowance must be made for some shrinkage of the material as it is dried.

The apparatus is provided with air heaters 4, 5 6 and 7, each of which is associated with a blower, which passes the warmed air to an associated manifold, which communicates with ports in the casing at a number of points along its length. It will be seen from FIGURE 2 that the blower heaters inject warmed air at varying levels and that all the air is drawn off into an exhaust manifold through exhaust ports 8. The heaters 4 and 5 are of much larger capacity than the heaters 6 and 7. In a typical operation the heater 7 would be capable of delivering one volume of warm air at 160° F. and the heater 4 would be capable of delivering four to ten volumes at 350° F.

Preferably in operation, sliced or diced vegetables are delivered from a feed hopper 9 to the top run of the conveyor at a speed sufficient to maintain a layer of about ½" depth on it, whilst the slower moving bottom conveyor 3 has a layer of partially dehydrated material of nearly 3" depth thereon. The material at the completion of the process, which takes about 1 to 4 hours, depending on the product and its particle size, discharges from the bottom run of the conveyor 3 to a discharge chute 10.

The construction of the conveyor is illustrated in FIGURES 3 and 4. Each conveyor is, as shown in FIGURES 1 and 2, supported on a pair or two pairs of sprockets 11 at each end. The conveyor is constructed so as to provide a drive chain at each side and is built up from a series of cross bars 21, which are connected to each other by chain links 22, spaced apart by chain rollers 23 and located by pin 24. This provides drive chains for engagement with the sprockets 11. The cross bars 21 are arranged at 2" spacing.

Each cross bar 21 carries a stainless steel plate 25, having square pattern perforations therein, as discussed above. Each plate 25 is welded to or is integral with a tubular portion 26, which is mounted on the cross bar 21. The plates 25 are maintained in a horizontal position during their movement through the horizontal runs of the conveyor by rails 27 so that the run of the conveyor acts as a perforated tray. The rails 27 terminate at the dropping points D, so that on reaching those points the free edges of the plates 25, which trail behind their associated cross bars 21, drop and the material carried thereon is dropped onto the conveyor run below. Each conveyor run, except the top run, of conveyor 1, is thus fed at short intervals with separate quantities of partially dried material. As already pointed out it is essential for satisfactory dehydration that the layer of material carried on the continuously moving tray constituted by the conveyor should be of a reasonable uniform thickness. I have found that for diced or sliced vegetables of the sizes which can economically be dehydrated by means of warmed air, the width of the plates 25 must not be more than about three inches and is preferably about two inches to ensure that there is a reasonably even spread of material on the next conveyor run, which will ordinarily be at a distance of about 1 foot below.

Some form of rotating beater is preferably provided to shake the plates, without impact or injury to the product when they are hanging vertical, so as to dislodge any partially dried pieces adhering to the plates.

Whilst the invention is thus described in application to the drying of fruits or vegetables it is obvious the regularity of surface changes induced by gravity and without mechanical impact on product would yield corresponding advantage to any process requiring the extraction or insertion of heat or water by the application of air or gas at its surface, thus conditioning or adding water to a food in particle form, or in freezing the same, or in blanching the same in which last event the first run of the top conveyor would be run as a steam or water blancher.

I claim:

1. An apparatus for the dehydration of fruit and vegetables which comprises one or more endless conveyors arranged within a casing, through which a stream of warm air is passed, each conveyor being formed from a series of perforated plate-like members, pivoted about axes which extend perpendicularly to the direction of movement of the conveyor, the said plate-like members being adopted to be maintained in the same plane so that the upper and lower run of the conveyor act as a tray for a bed of material and to pivot individually at a dropping point at the end of each conveyor run to drop the material supported thereon onto a conveyor run below, the width of each plate-like member in the direction of movement of the conveyor being related to its distance above the next conveyor run in such manner that the material falling onto the next conveyor run forms a bed of substantially uniform thickness: wherein means are provided for driving the conveyors at successively decreasing velocities, an air exhaust at the top of the casing and means for injecting warm air at a plurality of points arranged at different levels in the casing, and wherein separate means are employed for heating the air injected at different levels, whereby both the volume and temperature of air injected at a given level may be different from the volume and temperature of air injected at other levels.

References Cited

UNITED STATES PATENTS

| | | | |
|---|---|---|---|
| 2,109,704 | 3/1938 | Morrill | 34—223 XR |
| 234,412 | 11/1880 | Lee et al. | 34—203 |
| 1,284,218 | 11/1918 | Benjamin | 34—203 |
| 1,284,305 | 11/1918 | Gammel | 34—203 |
| 1,344,893 | 6/1920 | Hofmann | 34—207 |
| 1,568,791 | 11/1926 | Aiken | 34—66 |
| 1,736,980 | 11/1929 | Panzireff | 34—205 |
| 3,023,513 | 3/1962 | Herte et al. | 34—203 |

FREDERICK L. MATTESON, Jr., *Primary Examiner.*

H. B. RAMEY, *Assistant Examiner.*